(12) United States Patent
Kim et al.

(10) Patent No.: US 11,016,615 B2
(45) Date of Patent: May 25, 2021

(54) TOUCH SENSOR PANEL

(71) Applicant: HiDeep Inc., Seongnam-si (KR)

(72) Inventors: Seyeob Kim, Seongnam-si (KR);
Jongsik Kim, Seongnam-si (KR)

(73) Assignee: HiDeep Inc.

( * ) Notice: Subject to any disclaimer, the term of this patent is extended or adjusted under 35 U.S.C. 154(b) by 0 days.

(21) Appl. No.: 16/212,775

(22) Filed: Dec. 7, 2018

(65) Prior Publication Data

US 2019/0179451 A1 Jun. 13, 2019

(30) Foreign Application Priority Data

Dec. 7, 2017 (KR) .................. 10-2017-0167746

(51) Int. Cl.
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC .......... G06F 3/044; G06F 2203/04112; G06F 2203/04111; G06F 2203/04103
See application file for complete search history.

(56) References Cited

U.S. PATENT DOCUMENTS

| 2016/0224181 A1* | 8/2016 | Kim | G06F 3/044 |
| 2017/0262096 A1* | 9/2017 | Kim | G06F 3/0446 |
| 2017/0262112 A1* | 9/2017 | Noguchi | G06F 3/044 |
| 2018/0175116 A1* | 6/2018 | Song | G06F 3/0412 |
| 2019/0138137 A1* | 5/2019 | Sakaue | H05K 3/1275 |

FOREIGN PATENT DOCUMENTS

| JP | 2009205321 | 9/2009 |
| KR | 2014-0044651 A | 4/2014 |
| KR | 2017-0012315 A | 2/2017 |

OTHER PUBLICATIONS

Korean Office Action for Related KR Patent Application No. 10-2017-0167746 dated Feb 26, 2019.
Japanese Office Action issued in Japanese Application No. 2018-210615 dated Nov. 5, 2019.

* cited by examiner

*Primary Examiner* — Kent W Chang
*Assistant Examiner* — Andrew Lee
(74) *Attorney, Agent, or Firm* — The Belles Group, P.C.

(57) ABSTRACT

A touch sensor panel may be provided that includes: a plurality of drive electrodes which extend in a first layer in a first axial direction and sense touch; a plurality of dummy drive electrodes which extend in the first layer in the first axial direction and do not sense the touch; a plurality of receiving electrodes which extend in a second layer in a second axial direction crossing the first axial direction and sense the touch; and a plurality of dummy receiving electrodes which extend in the second layer in the second axial direction and do not sense the touch. A part of a capacitance path between the drive electrode and the receiving electrode is blocked.

11 Claims, 15 Drawing Sheets

10 : DRIVE ELECTRODE
11 : DUMMY DRIVE ELECTRODE

20 : RECEIVING ELECTRODE
21 : DUMMY RECEIVING ELECTRODE

TOUCH SENSOR PANEL

CROSS-REFERENCE TO RELATED PATENT APPLICATIONS

The present application claims priority to Korean Patent Application No. 10-2017-0167746, filed Dec. 7, 2017. The disclosure of the aforementioned priority application is incorporated herein by reference in its entirety.

BACKGROUND

Field

The present disclosure relates to a touch sensor panel and more particularly to a touch sensor panel which reduces a base capacitance by deforming a dummy drive electrode and/or a dummy receiving electrode.

Description of the Related Art

Various kinds of input devices are being used to operate a computing system. For example, the input device includes a button, key, joystick and touch screen. Since the touch screen is easy and simple to operate, the touch screen is increasingly being used to operate the computing system.

The touch screen may include a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the display screen by a finger, etc. Generally, the touch screen recognizes the touch and a position of the touch on the display screen, and the computing system analyzes the touch, and thus, performs operations in accordance with the analysis.

In general, for the purpose of improving visibility, the touch sensor panel includes even a dummy electrode which does not sense the touch of an object. As such, the size of the base capacitance when the dummy electrode is included becomes larger than the size of the base capacitance when only the common electrode is included. Particularly, when the pattern of the dummy electrode and the pattern of the common electrode are overlapped with each other, the size of the base capacitance may considerably increases. As a result, there occurs a problem that the sensitivity of the touch of the object is reduced.

SUMMARY

One embodiment is a touch sensor panel including: a plurality of drive electrodes which extend in a first layer in a first axial direction and sense touch; a plurality of dummy drive electrodes which extend in the first layer in the first axial direction and do not sense the touch; a plurality of receiving electrodes which extend in a second layer in a second axial direction crossing the first axial direction and sense the touch; and a plurality of dummy receiving electrodes which extend in the second layer in the second axial direction and do not sense the touch. A part of a capacitance path between the drive electrode and the receiving electrode is blocked.

BRIEF DESCRIPTION OF THE DRAWINGS

FIG. 2b shows the drive electrode and the dummy drive electrode of the touch sensor panel of FIG. 2a;

FIG. 2c shows the receiving electrode and the dummy receiving electrode of the touch sensor panel of FIG. 2a;

FIGS. 3b to 3d are cross sectional views obtained by cutting in the direction A-B of FIG. 3a;

DETAILED DESCRIPTION

Figure 1:
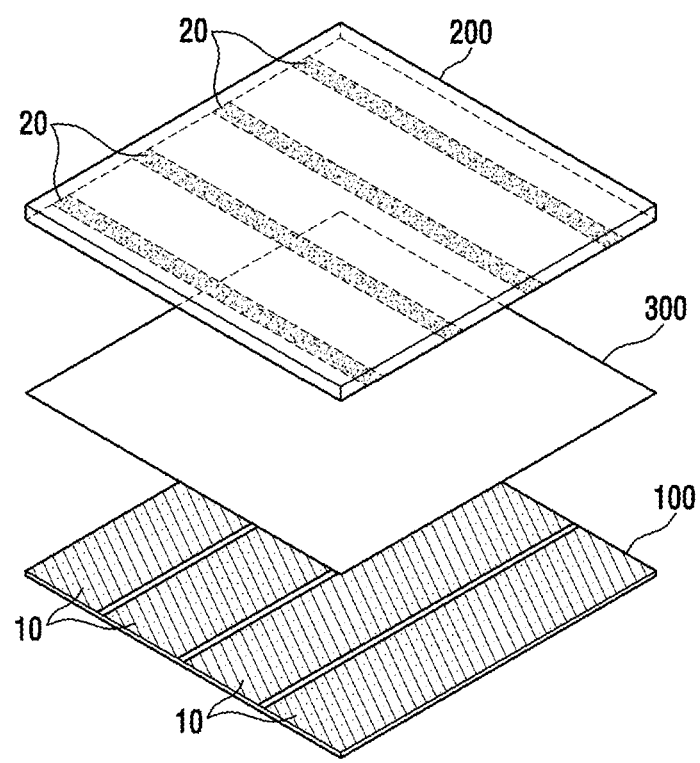
FIG. 1 is a schematic view of a capacitive touch sensor panel according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a touch sensor panel 1 according to an embodiment of the present invention will be described with reference to the accompanying drawings.

FIG. 1 is a schematic view of the capacitive touch sensor panel 1 according to an embodiment of the present invention. As shown in FIG. 1, the capacitive touch sensor panel 1 according to the embodiment of the present invention may include a drive electrode 10, a receiving electrode 20, and an insulation layer 300 located between the drive electrode 10 and the receiving electrode 20. Here, the touch sensor panel 1 according to the embodiment of the present invention may detect a capacitance change between the drive electrode 10 and the receiving electrode 20 and converts it into an appropriate electrical signal and outputs it.

Here, as shown in FIG. 1, the drive electrode 10 may be arranged on a first insulating sheet 100 and the receiving electrode 20 may be arranged on a second insulating sheet 200. The drive electrode 10 and the receiving electrode 20 may be arranged on mutually facing sides of the first insulating sheet 100 and the second insulating sheet 200 respectively. The first insulating sheet 100 and/or the second insulating sheet 200 may be made of an insulating material such as polyethylene terephthalate (PET) or glass. The drive electrode 10 and the receiving electrode 20 may be an indium tin oxide (ITO) electrode respectively.

FIG. 1 shows that the drive electrode 10 and the receiving electrode 20 are arranged in different layers respectively and the drive electrode 10 is arranged in the lower layer and the receiving electrode 20 is arranged in the upper layer as compared with the drive electrode 10. However, the scope of the present invention is not limited to this. The embodiment of the present invention can be applied to a case where the drive electrode 10 is arranged in the upper layer and the receiving electrode 20 is arranged in the lower layer.

The drive electrode 10 and the receiving electrode 20 may be arranged to cross each other. The touch sensor panel 1 according to the embodiment of the present invention has a predetermined capacitance value for each crossing of the drive electrode 10 and the receiving electrode 20. This capacitance value may change when an object such as a body part or stylus, etc., approaches. In order that the mutual capacitance is, as described above, formed between the drive electrode 10 and the receiving electrode 20, the insulation layer 300 may be included between the drive electrode 10 and the receiving electrode 20. The insulating layer 300 may be made of a material such as an optical clear adhesive or may be made of a material such as resin such that the first insulating sheet 100 and the second insulating sheet 200 are bonded to each other.

In the embodiment of the present invention, a drive signal may be applied to the drive electrode 10, and the receiving electrode 20 may receive a drive signal coupled by the mutual capacitance between the drive electrode 10 and the receiving electrode 20. The mutual capacitance between the drive electrode 10 and the receiving electrode 20 may change according to the touch, etc., by a part of the object such as a body or a stylus, etc. By detecting such a change of the electrical characteristic, the touch of the object and the position of the touch can be detected.

Hereinafter, a structure capable of reducing a base capacitance of the touch sensor panel 1 according to the embodiment of the present invention will be described. In general, in the case where the object does not touch the touch sensor panel 1, the size of the base capacitance formed in the touch sensor panel 1 itself when a dummy drive electrode 11 and a dummy receiving electrode 21 as well as the drive electrode 10 and the receiving electrode 20 are included as shown in FIG. 2 becomes larger than the size of the base capacitance formed in the touch sensor panel 1 itself when only the drive electrode 10 and the receiving electrode 20 are included as shown in FIG. 1. If the size of the base capacitance increases considerably by including the dummy drive electrode 11 and the dummy receiving electrode 21, the sensitivity of the touch is reduced. Therefore, in order to improve the touch sensitivity of even the touch sensor panel 1 including the dummy drive electrode 11 and the dummy receiving electrode 21, the embodiment of the present invention intends to implement the touch sensor panel 1 including the deformed dummy drive electrode 11 and/or the deformed dummy receiving electrode 21.

Figure 2A:
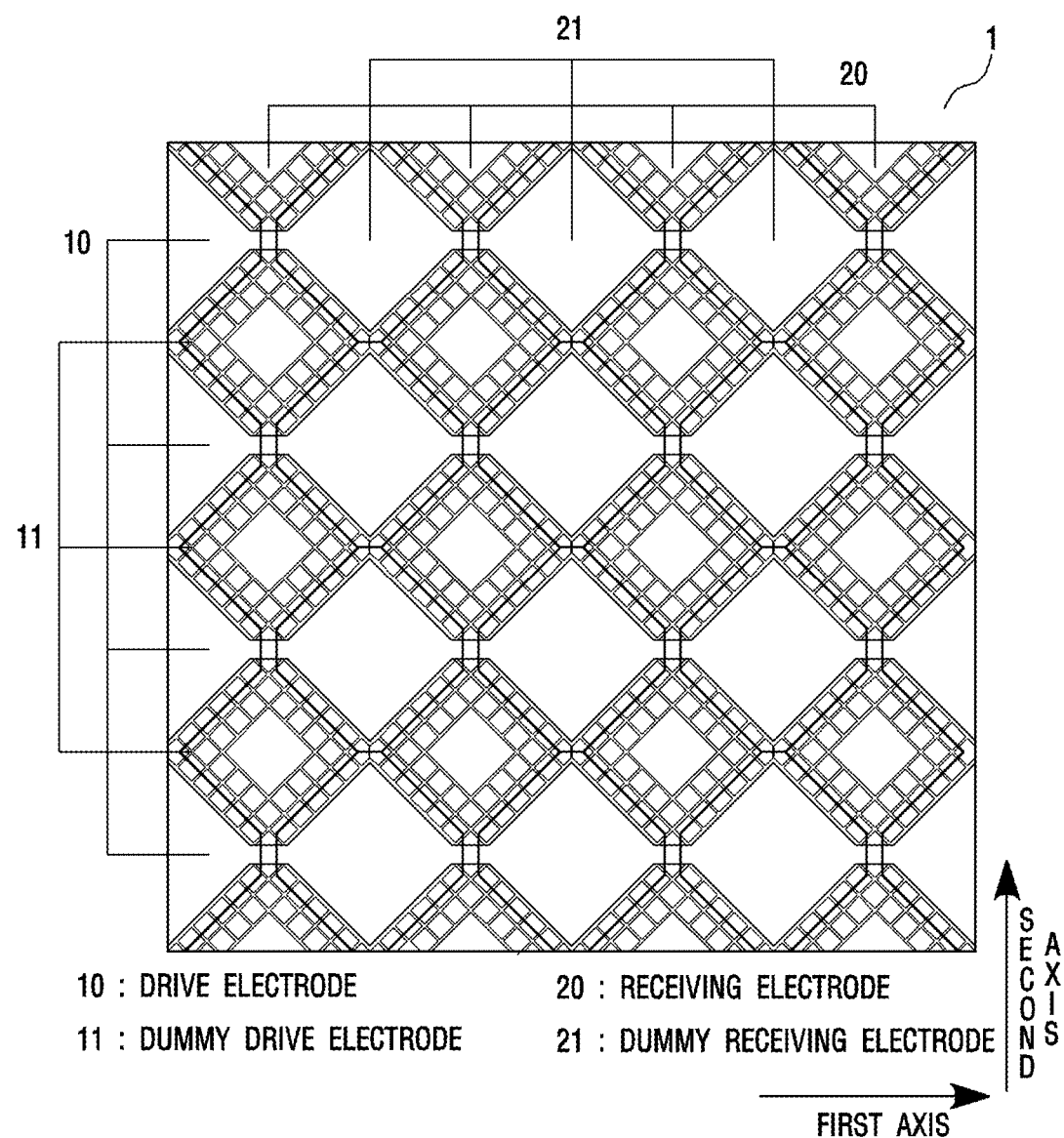
FIG. 2a is a cross sectional view showing the arrangement of respective electrodes when the touch sensor panel according to the embodiment of the present invention includes not only a drive electrode and a receiving electrode but also a dummy drive electrode and a dummy receiving electrode.
Figure 2B:
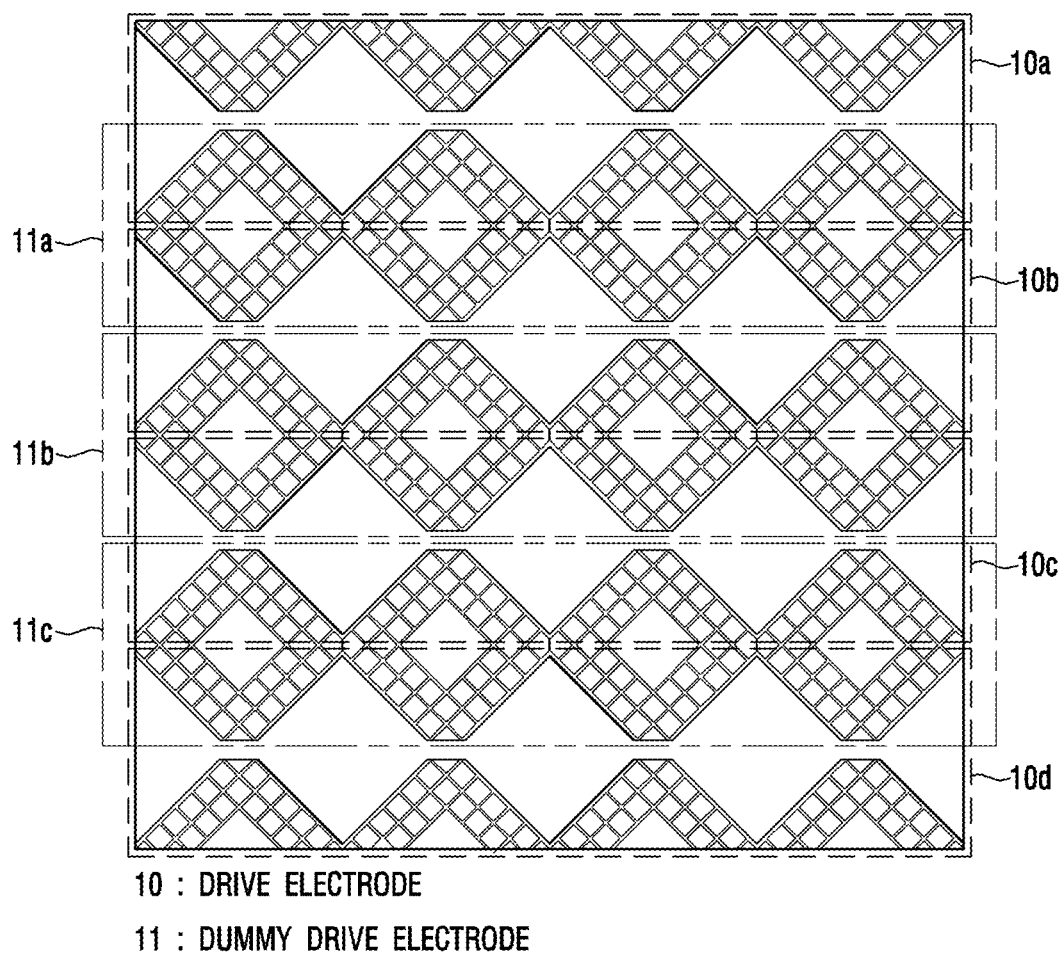
Figure 2C:
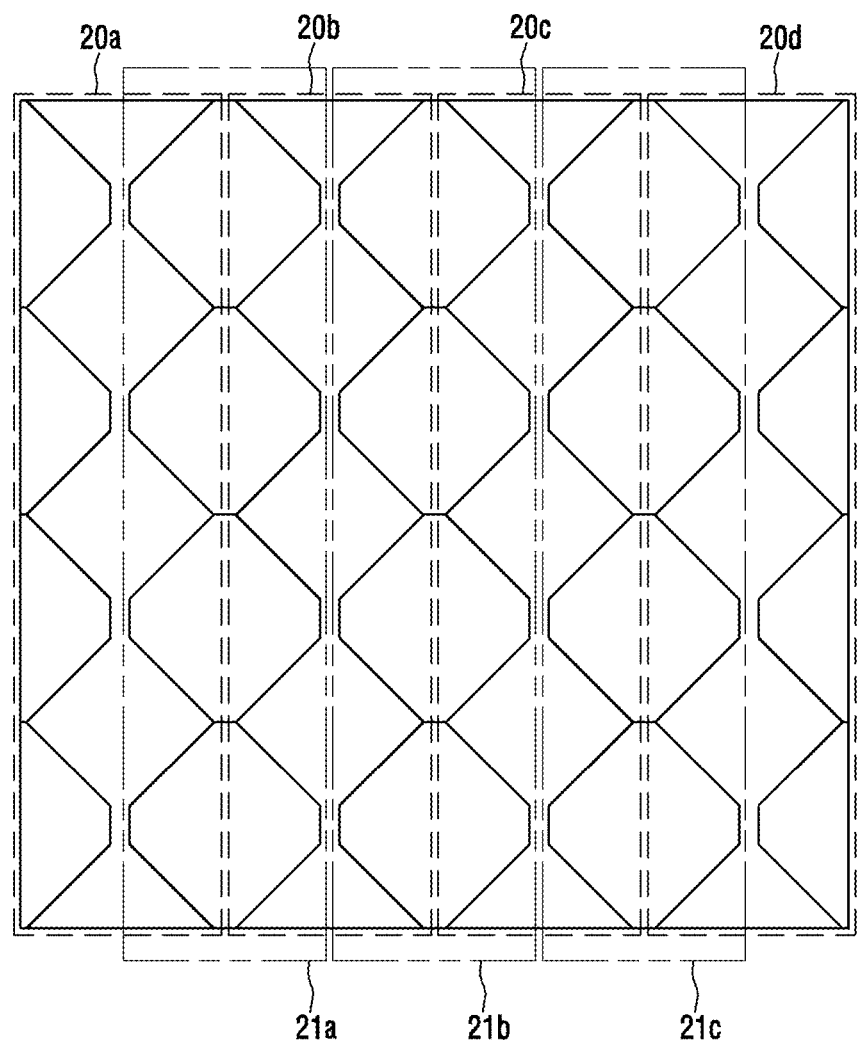

FIG. 2a is a cross sectional view showing the arrangement of respective electrodes when the touch sensor panel 1 according to the embodiment of the present invention includes not only the drive electrode 10 and the receiving electrode 20 but also the dummy drive electrode 11 and dummy receiving electrode 21. In addition, FIG. 2b shows the drive electrode 10 and the dummy drive electrode 11 of the touch sensor panel 1 of FIG. 2a. FIG. 2c shows the receiving electrode 20 and the dummy receiving electrode 21 of the touch sensor panel 1 of FIG. 2a.

As shown in FIG. 2b, the touch sensor panel 1 according to the embodiment of the present invention may include a plurality of the drive electrodes 10a, 10b, 10c, and 10d which extend in a first layer in a first axial direction and sense the touch, and a plurality of the dummy drive electrodes 11a, 11b, and 11c which extend in the first layer in the first axial direction and do not sense the touch.

As shown in FIG. 2c, the touch sensor panel 1 according to the embodiment of the present invention may include a plurality of the receiving electrodes 20a, 20b, 20c, and 20d which extend in a second layer in a second axial direction crossing the first axial direction and sense the touch, and a plurality of the dummy receiving electrodes 21a, 21b, and 21c which extend in the second layer in the second axial direction and do not sense the touch.

Here, an example will be described in FIG. 3, in which the dummy drive electrode 11 and/or the dummy receiving electrode 21 are/is deformed, and thus a part of a capacitance path between the drive electrode 10 and the receiving electrode 20 is blocked, so that the base capacitance is reduced.

Figure 3A:
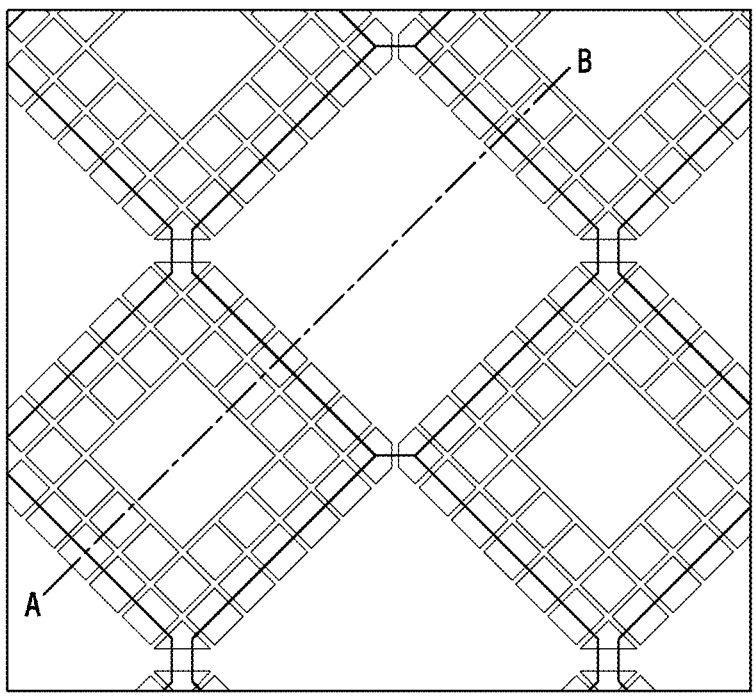
FIG. 3a shows a result obtained by assuming that an enlarged part of FIG. 2a is cut in a direction A-B.

FIG. 3a shows a result obtained by assuming that an enlarged part of FIG. 2a is cut in a direction A-B. Cross sectional views obtained by cutting in the direction A-B are shown in FIGS. 3b to 3d.

Figure 3B:
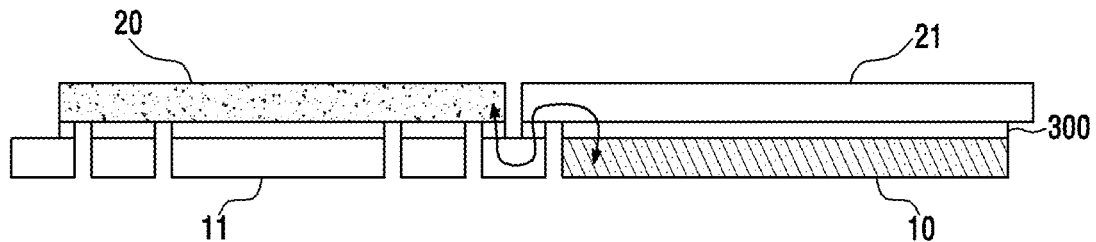

As shown in FIG. 3b, at least a portion of the plurality of dummy receiving electrodes 21 may be arranged at a position opposite to the position where the plurality of drive electrodes 10 are arranged, and at least a portion of the plurality of dummy drive electrodes 11 may be arranged at a position opposite to the position where the plurality of receiving electrodes 20 are arranged. In this case, the capacitance path is indicated by arrows. In other words, it can be seen that the base capacitance is formed through the dummy receiving electrode 21 and the dummy drive electrode 11 between the drive electrode 10 and the receiving electrode 20.

Figure 3C:
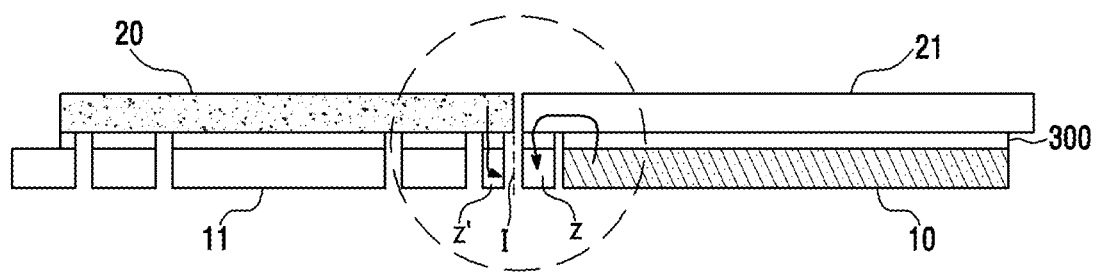
Figure 3D:
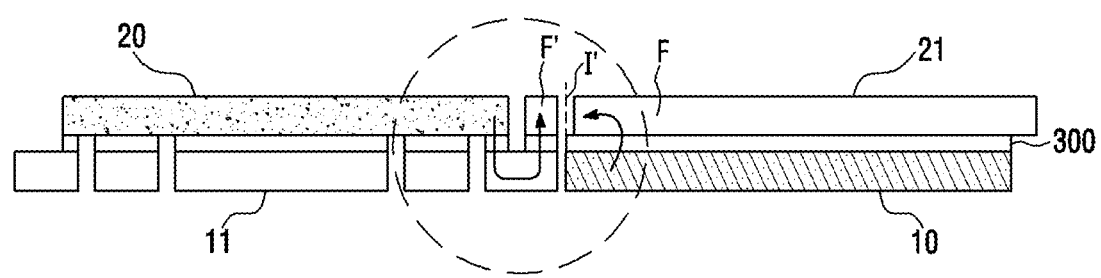

Meanwhile, FIG. 3c shows that a part of the base capacitance path is blocked by deforming a portion of the dummy drive electrode 11 of FIG. 3b.

As shown in FIG. 3c, the dummy drive electrode 11 may be deformed by cutting a portion of the dummy drive electrode 11. In particular, a portion of the dummy drive electrode 11 may be divided into a plurality of pieces by being cut along the outline of the receiving electrode 20. In this case, the dummy drive electrode is not formed in an area I of the first layer, which corresponds to the outline of the receiving electrode 20 formed in the second layer. At least a portion (including Z') of the plurality of dummy drive electrodes 11 may be arranged at a position opposite to the position where the plurality of receiving electrodes 20 are arranged, and a portion (Z) of the remaining portion of the plurality of dummy drive electrodes 11 may be arranged at a position opposite to the position where the plurality of receiving electrodes 20 are not arranged. Unlike FIG. 3b, in FIG. 3c, it can be seen that the capacitance path between the first dummy drive electrode Z and the second dummy drive electrode Z' which are disposed in the first layer is blocked, so that the base capacitance becomes smaller than that of FIG. 3b.

Figure 3E:
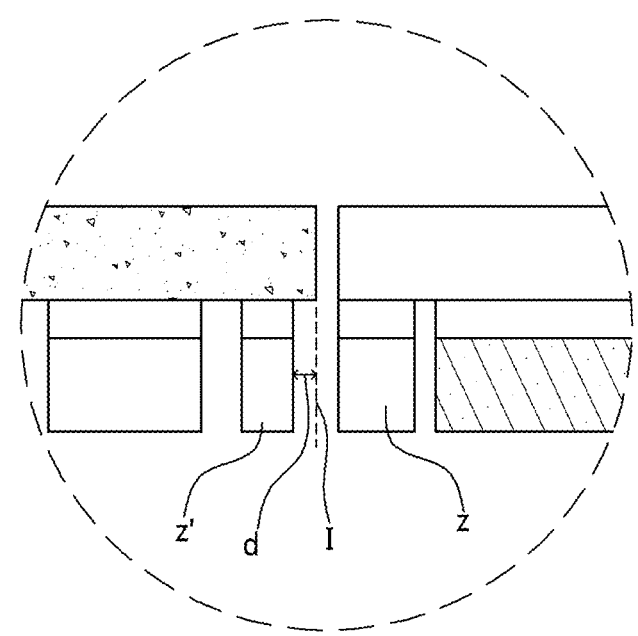
FIG. 3e shows that at least a portion of a plurality of the dummy drive electrodes is spaced apart at a distance larger than a predetermined distance "d" from an outline of the receiving electrode formed in the second layer.
Figure 3F:
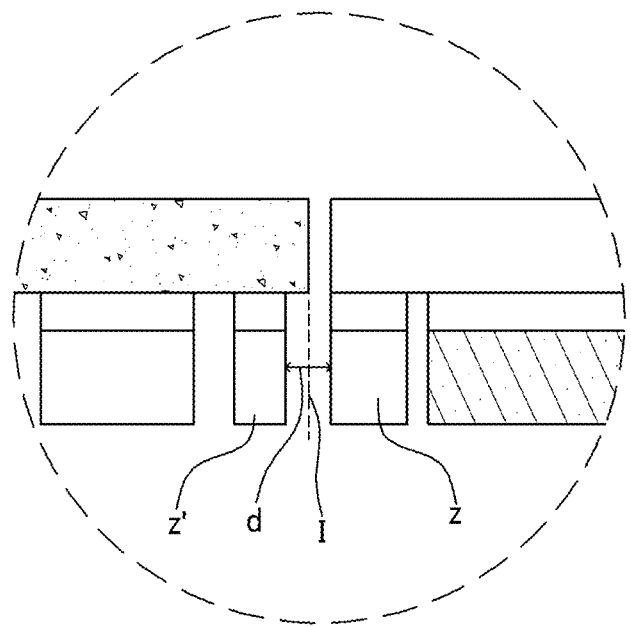
FIG. 3f shows that at least a portion of the plurality of dummy drive electrodes is spaced apart at a distance larger than a predetermined distance "d" from an outline of the dummy receiving electrode formed in the second layer.

According to the embodiment of the present invention, as shown in FIG. 3e, at least a portion (including Z') of the plurality of dummy drive electrodes 11 may be spaced apart at a distance larger than a predetermined distance "d" from the outline of the receiving electrode 20 formed in the second layer. According to another embodiment of the present invention, as shown in FIG. 3f, at least a portion (including Z') of the plurality of dummy drive electrodes 11 may be spaced apart at a distance larger than a predetermined distance "d" from the outline of the dummy receiving electrode 21 formed in the second layer. Further, the predetermined distance "d" shown in FIGS. 3e and 3f may be preset and stored in a memory (not shown).

Meanwhile, FIG. 3d shows that a part of the base capacitance path is blocked by deforming a portion of the dummy receiving electrode 21 of FIG. 3b.

As shown in FIG. 3d, the dummy receiving electrode 21 may be deformed by cutting a portion of the dummy receiving electrode 21. In particular, a portion of the dummy receiving electrode 21 may be divided into a plurality of pieces by being cut along the outline of the drive electrode 10. In this case, the dummy receiving electrode is not formed in an area I' of the second layer, which corresponds to the outline of the drive electrode 10 formed in the first layer. At least a portion (including F) of the plurality of dummy receiving electrodes 21 may be arranged at a position opposite to the position where the plurality of drive electrodes 10 are arranged, and a portion (F') of the remaining portion of the plurality of dummy receiving electrodes 21 may be arranged at a position opposite to the position where the plurality of drive electrodes 10 are not arranged. Unlike FIG. 3b, in FIG. 3d, it can be seen that the capacitance path between the first dummy receiving electrode F and the second dummy receiving electrode F' which have been formed in the second layer is blocked, so that the base capacitance becomes smaller than that of FIG. 3b.

Figure 3G:
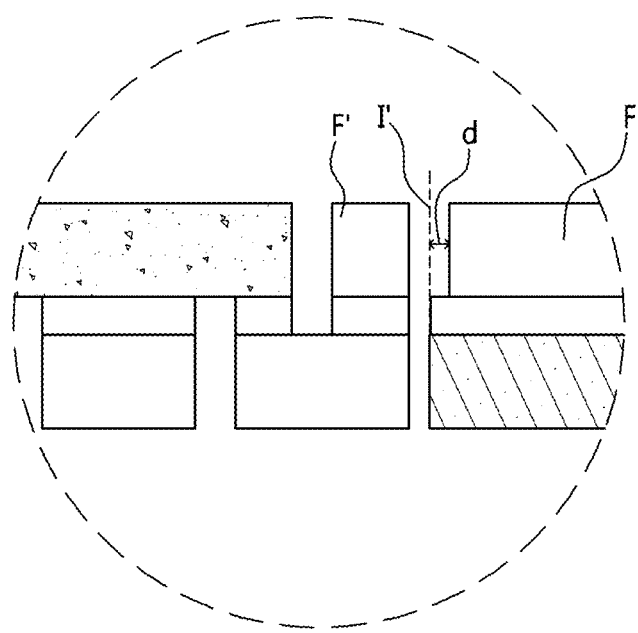
FIG. 3g shows that at least a portion of a plurality of the dummy receiving electrodes is spaced apart at a distance larger than a predetermined distance "d" from an outline of the drive electrode formed in the first layer.
Figure 3H:
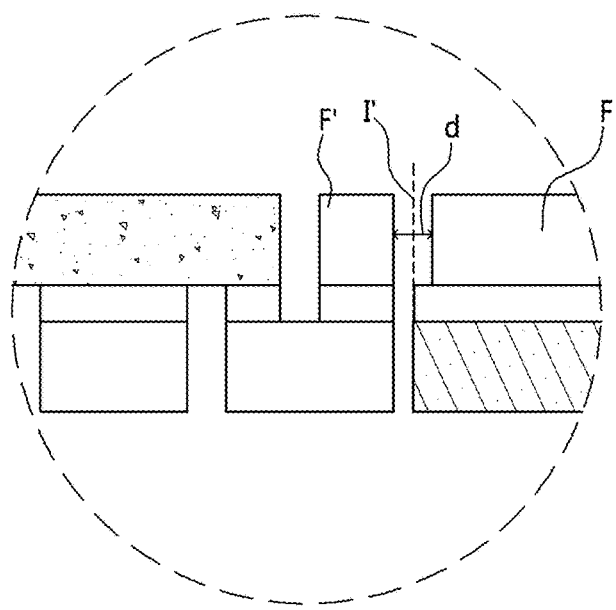
FIG. 3h shows that at least a portion of the plurality of dummy receiving electrodes is spaced apart at a distance larger than a predetermined distance "d" from an outline of the dummy drive electrode formed in the first layer.

According to the embodiment of the present invention, as shown in FIG. 3g, at least a portion (including F) of the plurality of dummy receiving electrodes 21 may be spaced apart at a distance larger than a predetermined distance "d" from the outline of the drive electrode 10 formed in the first layer. According to another embodiment of the present invention, as shown in FIG. 3h, at least a portion (including F) of the plurality of dummy receiving electrodes 21 may be spaced apart at a distance larger than a predetermined distance "d" from the outline of the dummy drive electrode 11 formed in the first layer. Further, the predetermined distance "d" shown in FIGS. 3g and 3h may be preset and stored in a memory (not shown).

Thus, by deforming the dummy electrode as shown in FIGS. 3c to 3h, the base capacitance can be reduced and the touch sensitivity can be improved.

Hereinafter, the shape of the touch sensor panel composed of the above-described dummy electrode and deformed dummy electrode will be described.

Figure 4A:
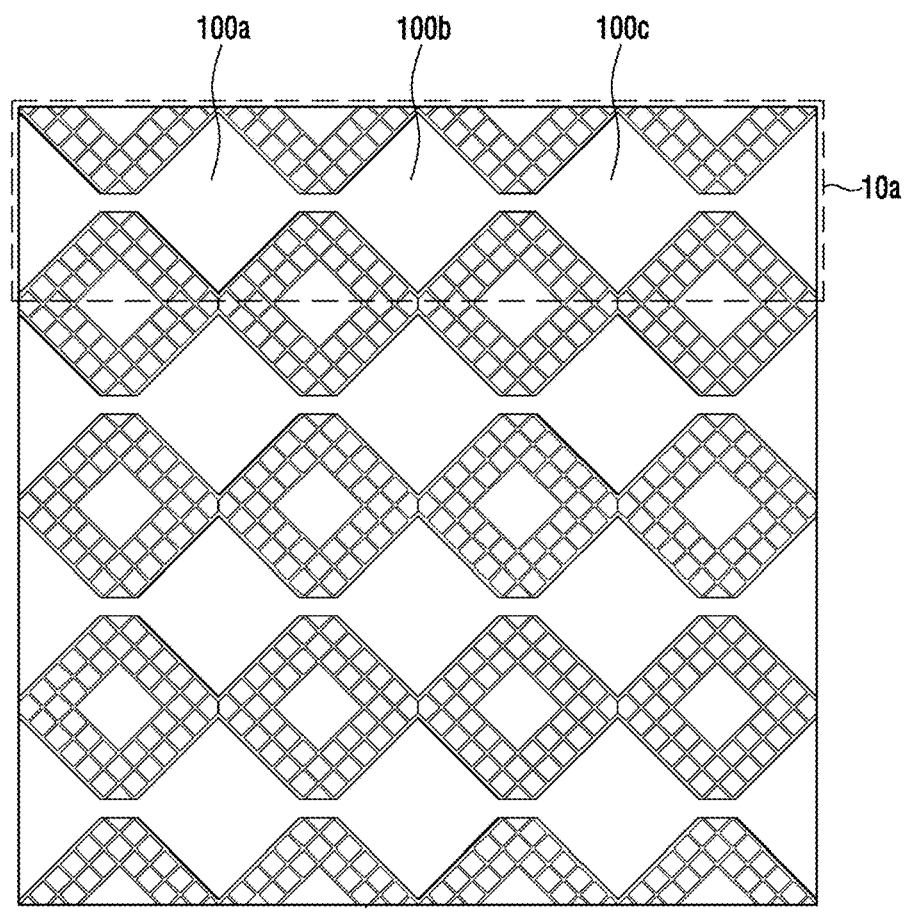
FIG. 4a shows that, in each of a plurality of the drive electrodes, a plurality of drive electrode pads are connected in a first axial direction.
Figure 4B:
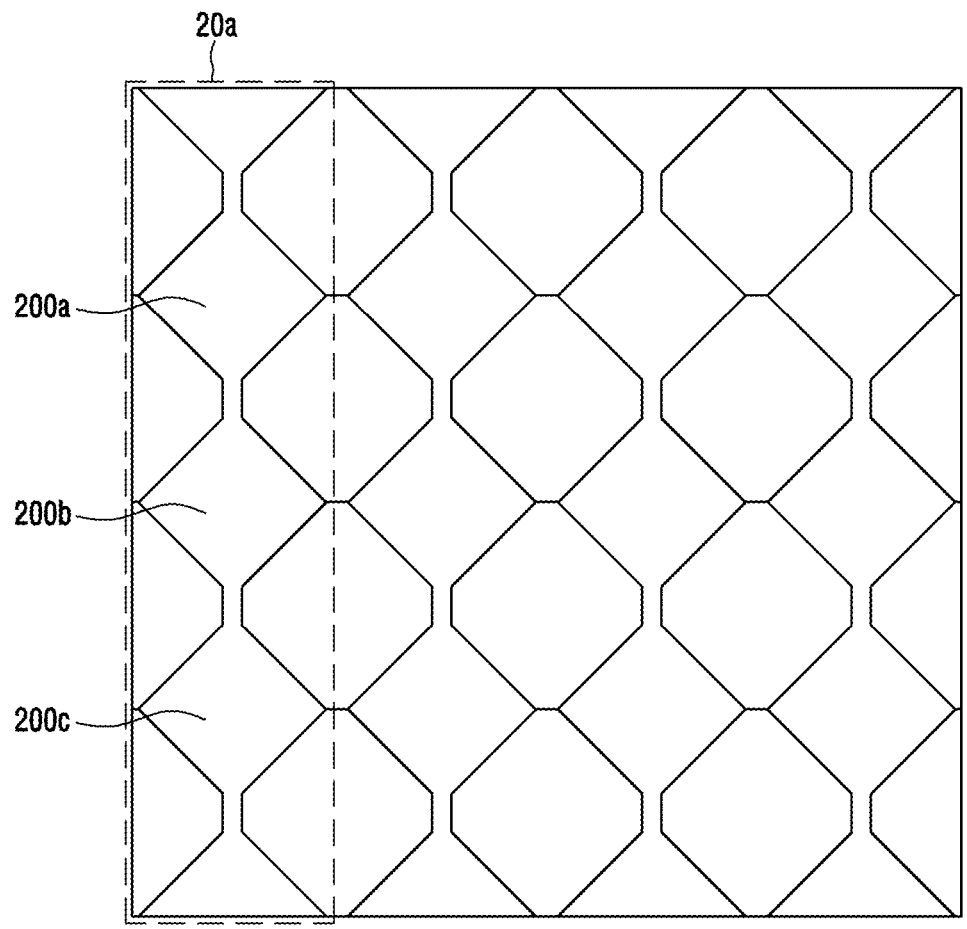
FIG. 4b shows that, in each of a plurality of the receiving electrodes, a plurality of receiving electrode pads are connected in a second axial direction.

As shown in FIG. 4a, in each of the plurality of drive electrodes 10a, a plurality of drive electrode pads 100a, 100b, and 100c may be connected in the first axial direction. As shown and in FIG. 4b, in each of the plurality of receiving electrodes 20a, a plurality of receiving electrode pads 200a, 200b, and 200c are connected in the second axial direction.

Figure 4C:
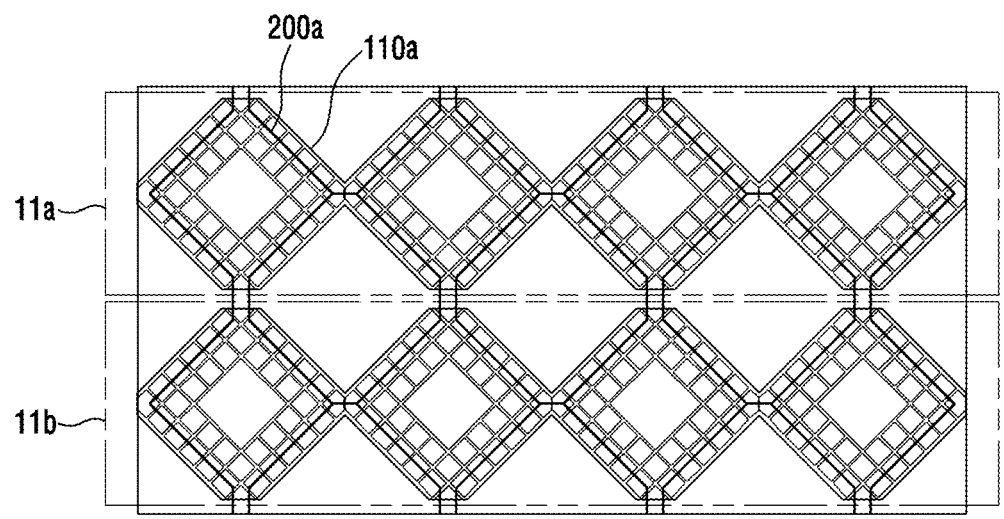
FIG. 4c shows that the plurality of dummy drive electrodes include one or more dummy drive pads at respective positions where the dummy drive electrodes face the receiving electrode pad.
Figure 5A:
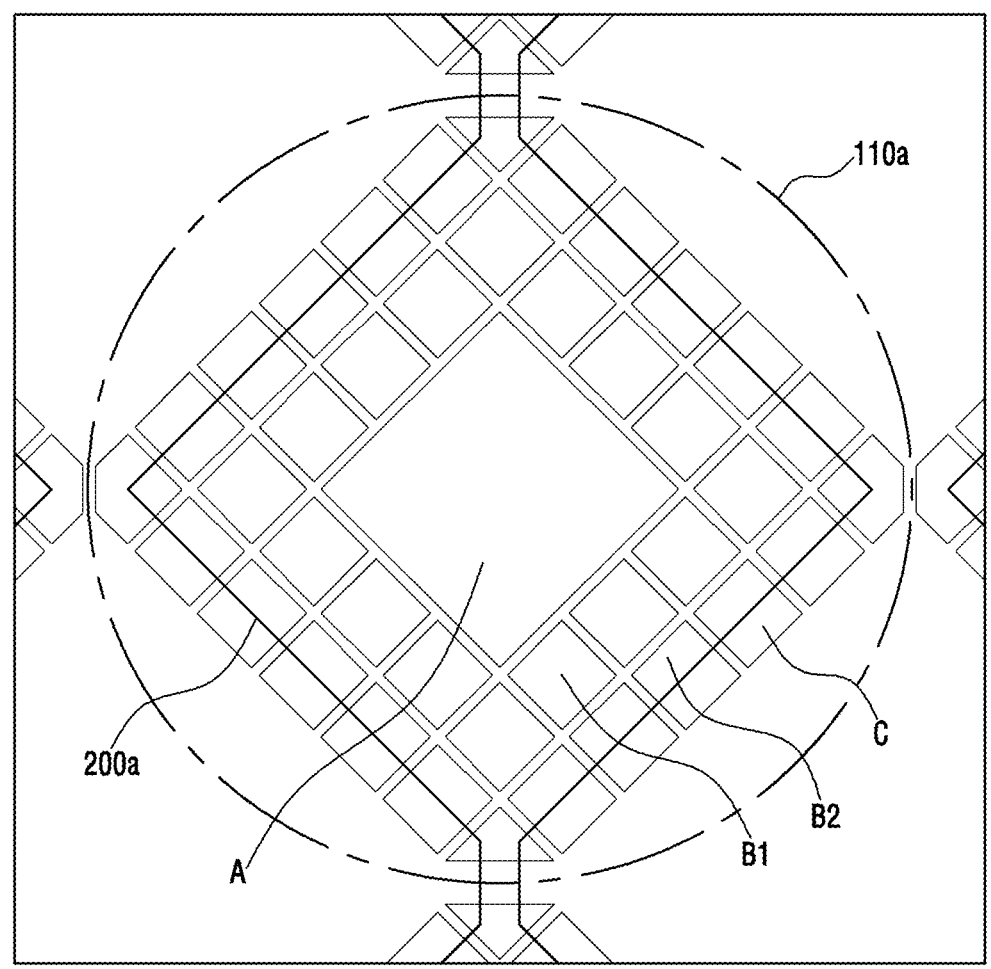
FIG. 5a shows that the dummy drive pad includes a first dummy drive pad, a plurality of second dummy drive pads, and a plurality of third dummy drive pads.

Also, as shown in FIG. 4c, the plurality of dummy drive electrodes 11a and 11b may include one or more dummy drive pads 110a at respective positions where the dummy drive electrodes face the receiving electrode pad 200a. As shown in FIG. 5a, the dummy drive pad 110a may include a first dummy drive pad "A" disposed in the center of the position where the dummy drive pad faces the receiving electrode pad 200a, a plurality of second dummy drive pads "B1 and B2" disposed at a position which not only surrounds the first dummy drive pad "A" but also faces the position where the receiving electrode pad 200a is disposed, and a plurality of third dummy drive pads "C" disposed outside the receiving electrode pad 200a. According to the embodiment, at least a portion B2 of the second dummy drive pads "B1 and B2" disposed at the position faces the position where the receiving electrode pad 200a is disposed may have the same size as that of the third dummy drive pad "C" disposed outside the receiving electrode pad 200a.

Figure 4D:
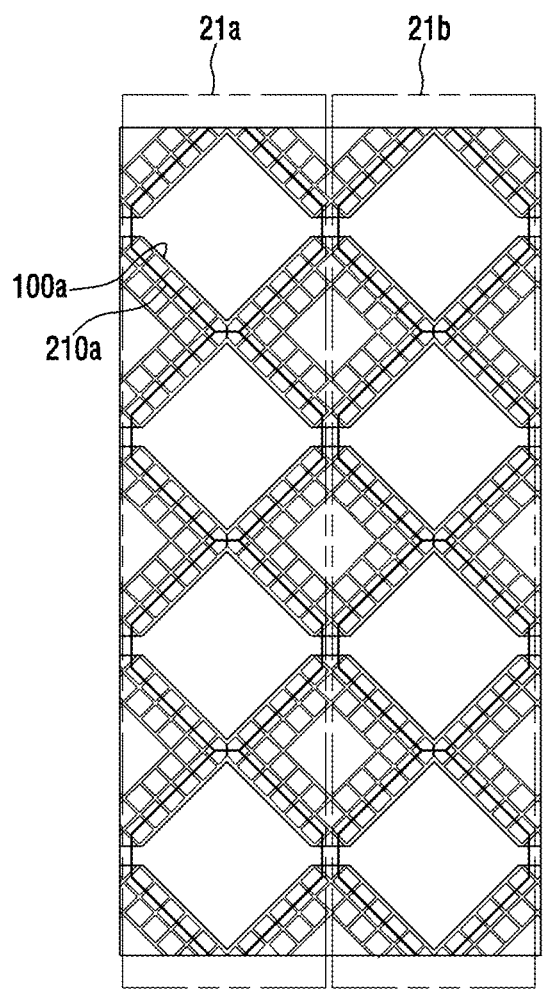
FIG. 4d shows that the plurality of dummy receiving electrodes include one or more dummy receiving pads at respective positions where the dummy receiving electrodes face the drive electrode pad.
Figure 5B:
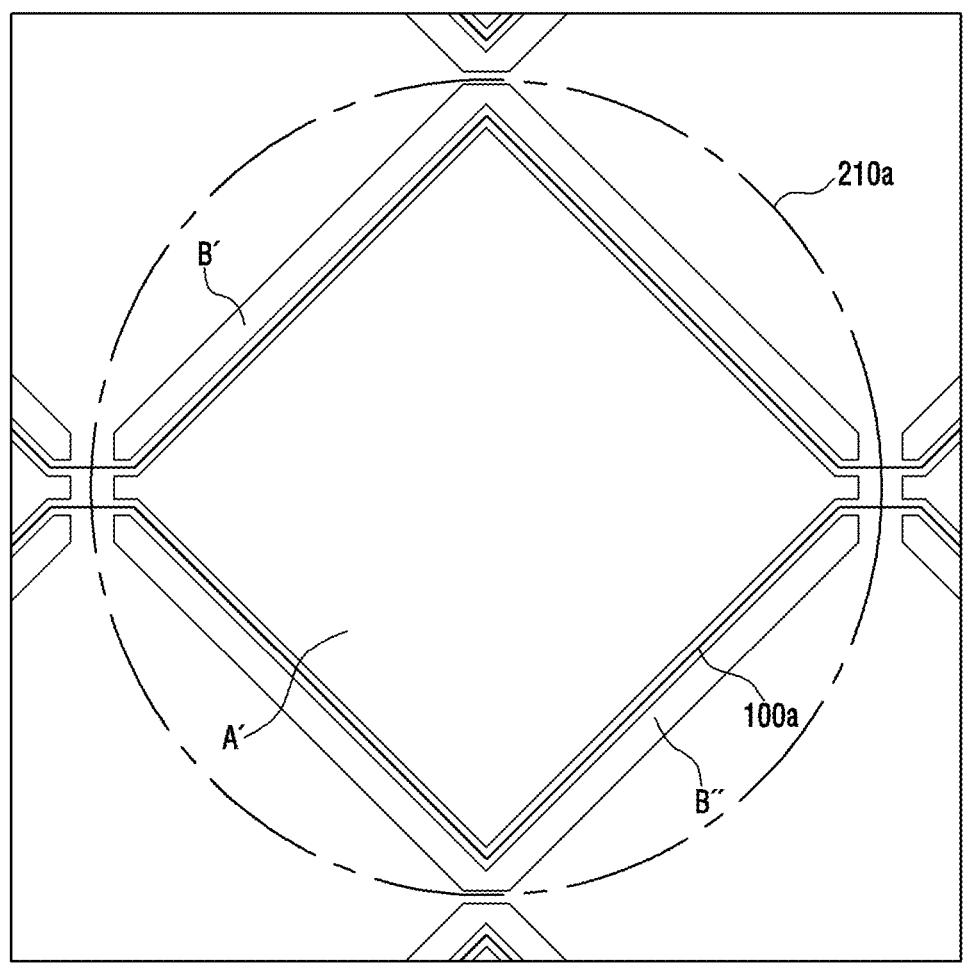
FIG. 5b shows that the dummy receiving pad includes a first dummy receiving pad and a plurality of second dummy receiving pads.

Meanwhile, as shown in FIG. 4d, the plurality of dummy receiving electrodes 21a and 21b may include one or more dummy receiving pads 210a at respective positions where the dummy receiving electrodes face the drive electrode pad 100a. As shown in FIG. 5b, the dummy receiving pad 210a may include a first dummy receiving pad "A'" disposed in the center of the position where the dummy receiving pad faces the drive electrode pad 100a, and a plurality of second dummy receiving pads "B' and B''" disposed outside the drive electrode pad 100a. According to the embodiment, the sizes of the plurality of second dummy receiving pads "B' and B''" disposed outside the drive electrode pad 100a may be the same as each other.

In the embodiment of the present invention, the drive electrode pad/receiving electrode pad or the dummy drive pad/dummy receiving pad may have various shapes such as a rhombus, a hexagon, an octagon, etc.

Further, the shape or position of the drive electrode/receiving electrode is not limited to the shown embodiment. It is possible that the drive electrode (and the dummy drive electrode) of the shown embodiment may have the shape of the receiving electrode (and the dummy receiving electrode) and the receiving electrode (and the dummy receiving electrode) of the embodiment may have the shape of the drive electrode (and the dummy drive electrode). Further, both the receiving electrode (and the dummy receiving electrode) and the drive electrode (and the dummy drive electrode) may have the shown shape of the receiving electrode (and the dummy receiving electrode) or the shown shape of the drive electrode (and the dummy drive electrode).

Hereinafter, an experimental example in which, in the touch sensor panel 1 including even the dummy drive electrode 11 and the dummy receiving electrode 21, the base capacitance is reduced by blocking a part of the capacitance path between the drive electrode 10 and the receiving electrode 20 through deformation of the dummy drive electrode 11 and/or the dummy receiving electrode 21 will be described.

Figure 6A:
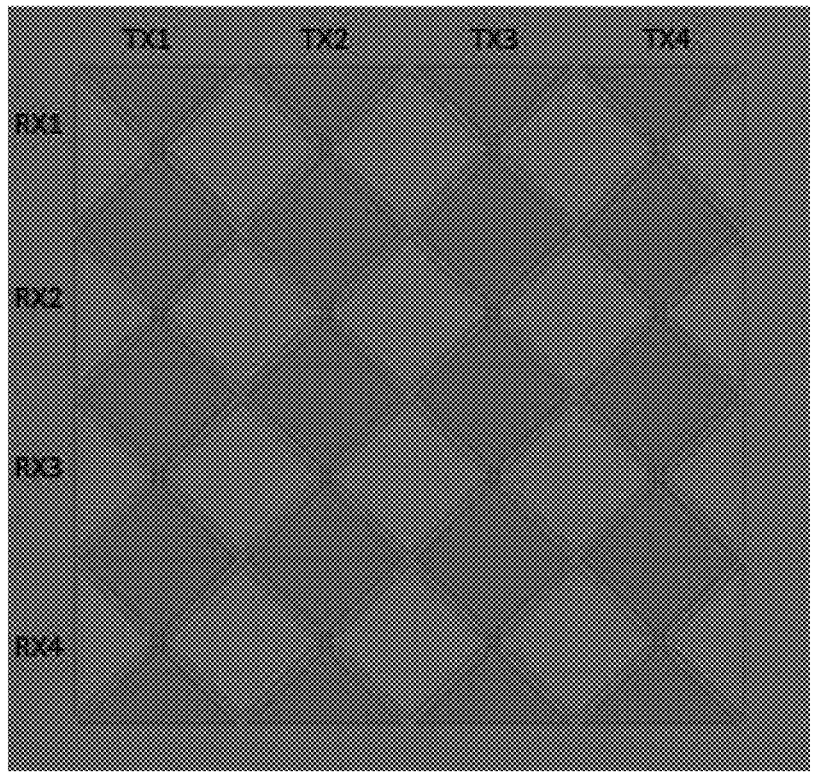
FIG. 6a shows an example of the touch sensor panel which does not include the dummy drive electrode and the dummy receiving electrode.

FIG. 6a shows an example of the touch sensor panel 1 which does not include the dummy drive electrode 11 and the dummy receiving electrode 21 as shown in FIG. 1. In this case, the size of the base capacitance is approximately 0.6 pF.

Figure 6B:
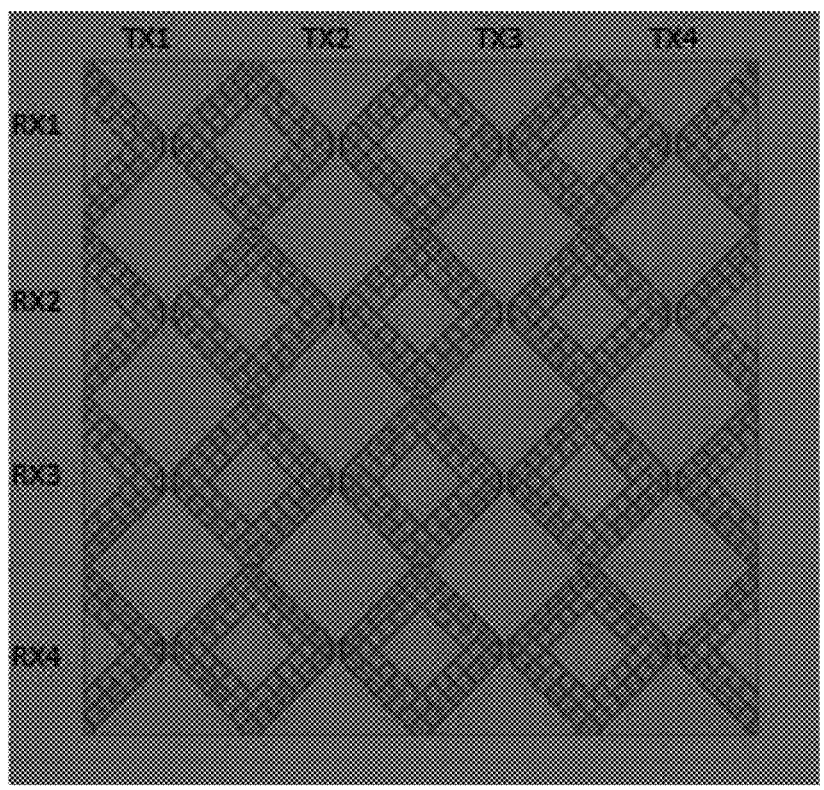
FIG. 6b shows an example of the touch sensor panel which includes both the dummy drive electrode and the dummy receiving electrode.

FIG. 6b shows an example of the touch sensor panel 1 which includes both the dummy drive electrode 11 and the dummy receiving electrode 21 as shown in FIG. 3b. In this case, it can be found that the size of the base capacitance is approximately 4.7 pF. That is, it can be seen that the size of the base capacitance becomes significantly larger than that of FIG. 6a, and the sensitivity of the touch is reduced.

Figure 6C:
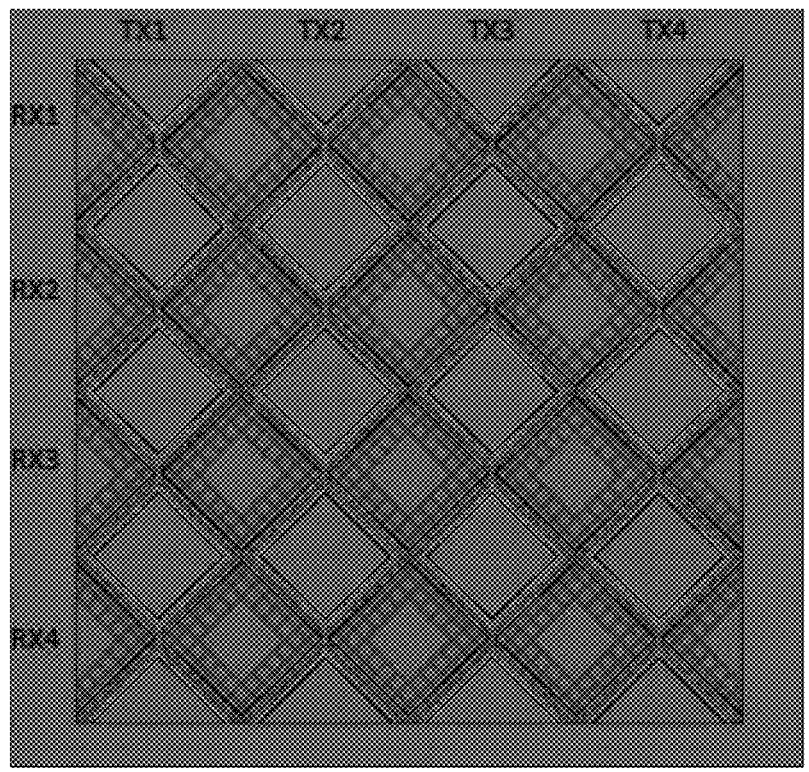
FIG. 6c shows an example of the touch sensor panel in which both the dummy drive electrode and the dummy receiving electrode are included and are deformed and a part of a capacitance path between the drive electrode and the receiving electrode is blocked.

Meanwhile, FIG. 6c shows an example of the touch sensor panel 1 in which both the dummy drive electrode 11 and the dummy receiving electrode 21 are included and are deformed and a part of the capacitance path between the drive electrode 10 and the receiving electrode 20 is blocked. In this case, it can be seen that the size of the base capacitance is reduced to approximately 0.7 pF as compared with the size of the base capacitance of FIG. 6b.

Figure 6D:
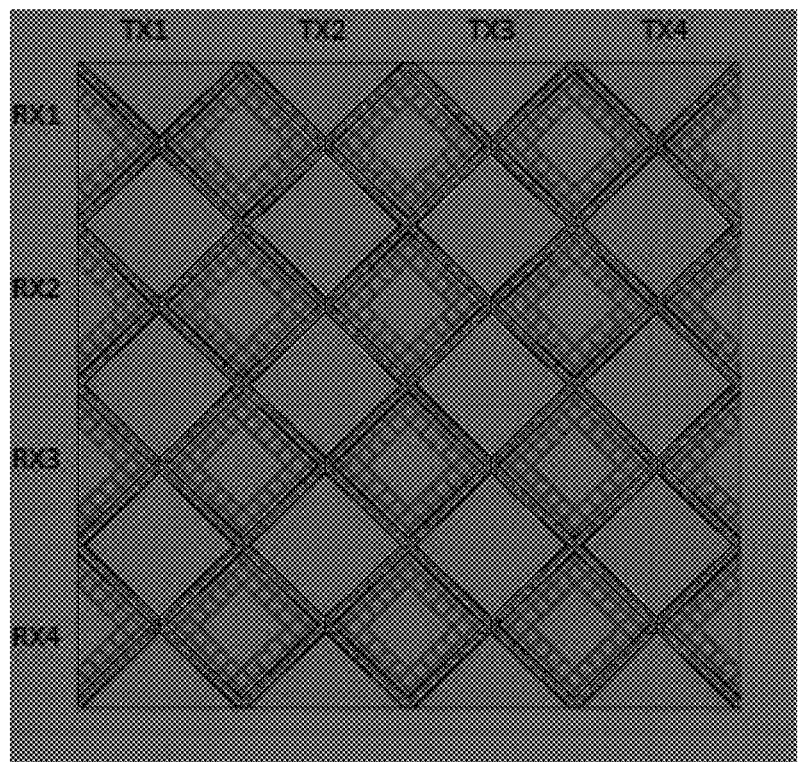
FIG. 6d shows an example of the touch sensor panel in which both the dummy drive electrode and the dummy receiving electrode are included and only the dummy drive electrode is deformed and a part of the capacitance path between the drive electrode and the receiving electrode is blocked.

FIG. 6d shows an example of the touch sensor panel 1 in which both the dummy drive electrode 11 and the dummy receiving electrode 21 are included and only the dummy drive electrode 11 is deformed and a part of the capacitance path between the drive electrode 10 and the receiving electrode 20 is blocked. In this case, it can be seen that the size of the base capacitance is reduced to approximately 0.9 pF as compared with the size of the base capacitance of FIG. 6b.

Figure 6E:
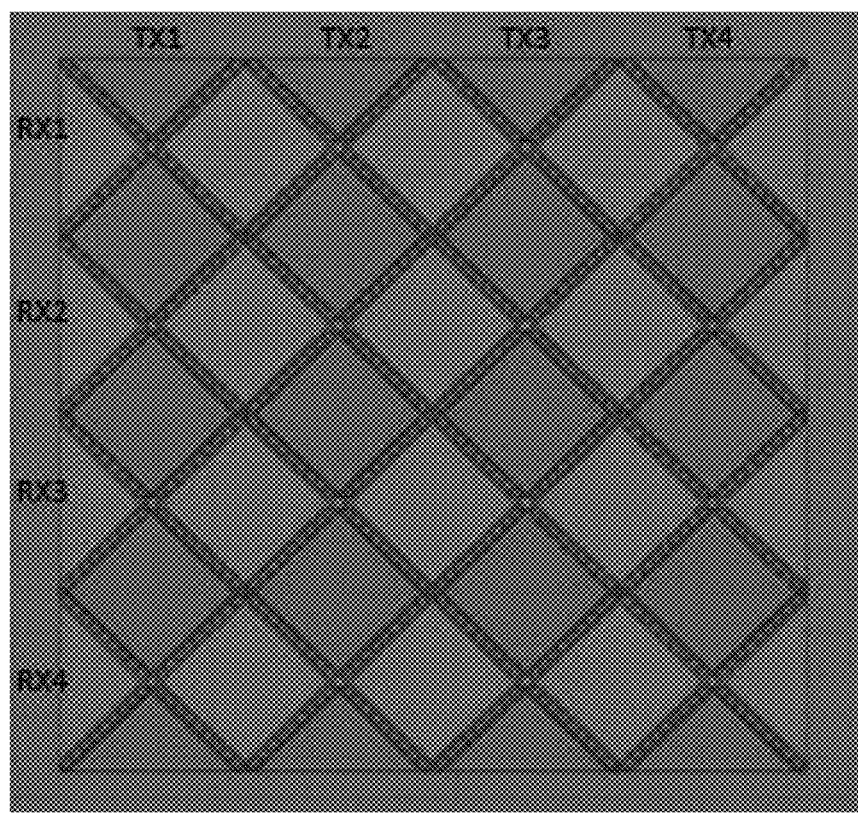
FIG. 6e shows an example of the touch sensor panel in which both the dummy drive electrode and the dummy receiving electrode are included and only the dummy receiving electrode is deformed and a part of the capacitance path between the drive electrode and the receiving electrode is blocked.

FIG. 6e shows an example of the touch sensor panel 1 in which both the dummy drive electrode 11 and the dummy receiving electrode 21 are included and only the dummy receiving electrode 21 is deformed and a part of the capacitance path between the drive electrode 10 and the receiving electrode 20 is blocked. In this case, it can be seen that the size of the base capacitance is reduced to approximately 0.9 pF as compared with the size of the base capacitance of FIG. 6b.

In FIGS. 6d and 6e, it can be seen that the size of the base capacitance is reduced similarly to that of FIG. 6c even though the size of the base capacitance is not significantly reduced the same as in FIG. 6c. In other words, according to the embodiment of the present invention, it can be found that when both the dummy drive electrode 11 and the dummy receiving electrode 21 are deformed or even when any one of the dummy drive electrode 11 and the dummy receiving electrode 21 is deformed, the size of the base capacitance is significantly reduced and the touch sensitivity can be improved.

The features, structures and effects and the like described in the embodiments are included in one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:
1. A touch sensor panel comprising:
a plurality of drive electrodes which extend in a first layer in a first axial direction and sense touch;
a plurality of dummy drive electrodes which extend in the first layer in the first axial direction and do not sense the touch;
a plurality of receiving electrodes which extend in a second layer in a second axial direction crossing the first axial direction and sense the touch; and
a plurality of dummy receiving electrodes which extend in the second layer in the second axial direction and do not sense the touch,
wherein a part of a capacitance path between the plurality of drive electrodes and the plurality of receiving electrodes is blocked via a deformation of at least one of the plurality of dummy drive electrodes or at least one of the plurality of dummy receiving electrodes,
wherein the deformation includes each of a plurality of dummy drive pads included in each of the plurality of dummy drive electrodes are not formed in an area of the first layer, which corresponds to an outline of each of a plurality of receiving electrode pads included in each of the plurality of receiving electrodes formed in the second layer or,
wherein each of a plurality of dummy receiving pads included in each of the plurality of dummy receiving electrodes are not formed in an area of the second layer, which corresponds to an outline of each of a plurality of drive electrode pads included in each of the plurality of drive electrodes formed in the first layer.

2. The touch sensor panel of claim 1,
wherein the plurality of dummy receiving electrodes are arranged at a position opposite to a position where the plurality of drive electrodes are arranged,
wherein the plurality of dummy drive electrodes are arranged at a position opposite to a position where the plurality of receiving electrodes are arranged.

3. The touch sensor panel of claim 2, wherein each of the plurality of dummy drive pads include pad parts which are spaced apart from each other around an outline of each of the plurality of receiving electrode pads.

4. The touch sensor panel of claim 3, wherein each of the plurality of dummy drive pads include a first pad which is arranged at a center of a position opposite to a position where each of the plurality of receiving electrode pads are arranged, a second pad which is arranged at a position surrounding the first pad, a third pad which is arranged at a position surrounding the second pad, and a fourth pad which is arranged at a position outside each of the receiving electrode pads, and
wherein the third pad and the fourth pad are spaced apart from each other around an outline of each of the plurality of receiving electrode pads.

5. The touch sensor panel of claim 1, wherein each of the plurality of dummy receiving pads include pad parts which are spaced apart from each other around outline of each of the plurality of drive electrode pads.

6. The touch sensor panel of claim 5, wherein each of the plurality of dummy receiving pads include a first pad which is arranged at a center of a position opposite to a position where each of the plurality of drive electrode pads are arranged and a second pad which is arranged at a position outside each of the drive electrode pads, and
wherein the first pad and the second pad are spaced apart from each other around an outline of each of the plurality of drive electrode pads.

7. The touch sensor panel of claim 1, wherein the at least one of the plurality of dummy drive electrodes are deformed by cutting a portion of the at least one of the plurality of dummy drive electrodes.

8. The touch sensor panel of claim 1, wherein the at least one of the plurality of dummy drive electrodes are deformed by cutting the at least one of the plurality of dummy drive electrodes along an outline of a receiving electrode.

9. A touch sensor panel comprising:
a plurality of drive electrodes which extend in a first layer in a first axial direction;
a plurality of dummy drive electrodes which extend in the first layer in the first axial direction;
a plurality of receiving electrodes which extend in a second layer in a second axial direction crossing the first axial direction; and
a plurality of dummy receiving electrodes which extend in the second layer in the second axial direction,
wherein a part of a capacitance path between the plurality of drive electrodes and the plurality of receiving electrodes is blocked via a deformation of at least one of the plurality of dummy drive electrodes, and
wherein each of a plurality of dummy drive pads included in each of the plurality of dummy drive electrodes are not formed in an area of the first layer, which corresponds to an outline of each of a plurality of receiving electrode pads included in each of the plurality of receiving electrodes formed in the second layer, or each of a plurality of dummy receiving pads included in each of the plurality of dummy receiving electrodes are not formed in an area of the second layer, which corresponds to an outline of each of a plurality of drive electrode pads included in each of the plurality of drive electrodes formed in the first layer.

10. The touch sensor panel of claim 9,
wherein the plurality of dummy receiving electrodes are arranged at a position opposite to a position where the plurality of drive electrodes are arranged,
wherein the plurality of dummy drive electrodes are arranged at a position opposite to a position where the plurality of receiving electrodes are arranged,
and wherein a dummy drive electrode is not formed in an area of the first layer, which corresponds to an outline of each of a plurality of receiving electrode pads included in each of the plurality of receiving electrodes formed in the second layer.

11. The touch sensor panel of claim 10, wherein each of a plurality of dummy drive pads included in each of the plurality of dummy drive electrodes include pad parts which are spaced apart from each other around an outline of each of the plurality of receiving electrode pads.

* * * * *